United States Patent [19]

Moriya

[11] 4,274,511
[45] Jun. 23, 1981

[54] ARRANGEMENT FOR MOUNTING A WEAR DETECTOR FOR BRAKE PAD

[75] Inventor: Michio Moriya, Itami, Japan

[73] Assignee: Sumitomo Electric Industries, Ltd., Osaka, Japan

[21] Appl. No.: 70,832

[22] Filed: Aug. 29, 1979

[30] Foreign Application Priority Data

Sep. 18, 1978 [JP] Japan ................. 53-128915

[51] Int. Cl.³ ........................................... F16D 66/02
[52] U.S. Cl. .................................................. 188/1 A
[58] Field of Search ...................... 188/1 A; 340/52 A

[56] References Cited

U.S. PATENT DOCUMENTS 3,689,880  9/1972  McKee et al. ............. 188/1 A X

FOREIGN PATENT DOCUMENTS 2827036  3/1979  Fed. Rep. of Germany ......... 188/1 A Primary Examiner—Duane A. Reger
Attorney, Agent, or Firm—Wenderoth, Lind & Ponack

[57] ABSTRACT

An improved arrangement for mounting a wear detector for a brake pad in a backing plate. A tubular holder has a few inwardly bent claws to hold the detector in position. A sleeve is mounted on the wear detector so as to receive the claws under a shoulder thereof. This arrangement assures accurate wear detection of the brake pad at a predetermined limit.

1 Claim, 4 Drawing Figures

U.S. Patent    Jun. 23, 1981    4,274,511
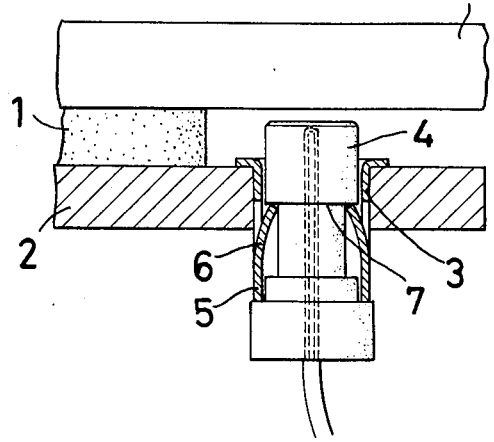
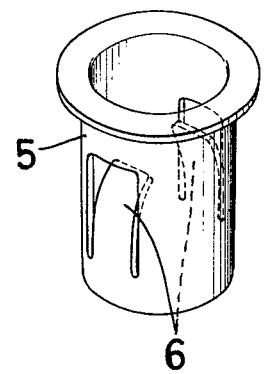
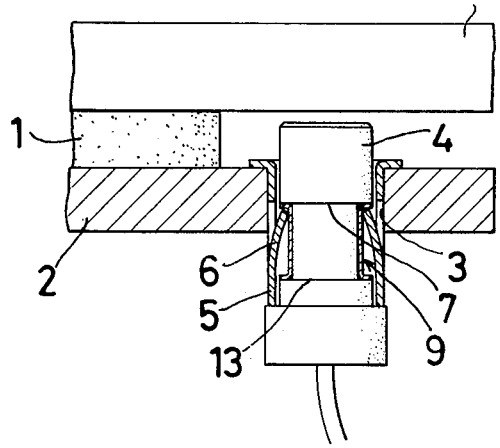
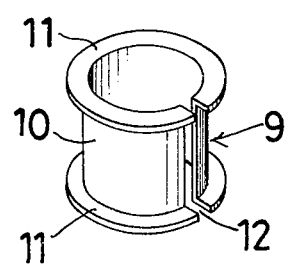

ARRANGEMENT FOR MOUNTING A WEAR DETECTOR FOR BRAKE PAD

The present invention relates to an arrangement for mounting a wear detector for a brake pad.

A wear detector for a brake pad is known which is mounted in a backing plate so as to detect that the wear of the brake pad has reached a limit. Such a wear detector has a detecting element adapted to operate when the brake pad has become worn to the limit so that the detector is urged and abraded by the brake disc.

The conventional arrangement for mounting a wear detector in the backing plate has a disadvantage that it cannot detect the limit of wear of the brake pad accurately because the wear detector is lowered under the pressing force applied thereto by the brake disc as will be described later in detail.

An object of the present invention is to provide an improved arrangement for mounting a wear detector which obviates the afore-mentioned shortcoming.

Other objects and advantages of this invention will become apparent from the following description taken with reference to the accompanying drawings, in which:

FIG. 1 is a vertical sectional view of the prior art arrangement for mounting a wear detector;

FIG. 2 is a perspective view of the holder for the wear detector;

FIG. 3 is a view similar to FIG. 1 of the arrangement embodying the present invention; and FIG. 4 is a perspective view of the sleeve used in this invention.

Referring to FIG. 1 illustrating the prior art arrangement for mounting a brake pad wear detector (hereinafter referred to as a probe), a brake pad 1 is fixedly attached to a backing plate 2 which has a hole 3 therethrough to mount a probe 4 for detecting the wear of the brake pad. To mount the probe 4, a tubular holder 5 having a flange at its top is fixedly mounted in the hole 3. As illustrated in FIG. 2, the holder 5 is provided with an opposed pair of inwardly bent claws 6. The detecting probe 4 is pushed into the holder 5 from the bottom against the resilience of the claws 6. When it has been mounted, the claws 6 engage a shoulder 7 of the probe 4.

The above-mentioned conventional arrangement has the advantage of easy and secure mounting. However, since the probe 4 is usually made of a relatively soft material such as silicon resin or phenol resin, the claws 6 tend to bite into the probe when the probe is urged downwardly by a brake disc 8 as the brake pad 1 gets worn. Thus, the probe 6 moves down slightly under the pressing force applied by the disc 8. This makes it impossible to detect the wear of the brake pad accurately at a predetermined limit of wear.

Referring to FIGS. 3 and 4 in which the same numerals are employed to designate the same or corresponding elements, the arrangement according to this invention further includes a sleeve 9 mounted on the central reduced portion of the probe 6. The sleeve 9 is made of a hard material such as metal.

The sleeve 9 has a tubular body 10 and flanges 11 at its top and bottom (FIG. 4). It also has a slit 12 which extends throughout its height to give it a resilience in the radial direction. In mounting, the sleeve 9 is spread apart from the slit 12 against the resilience and is put on the reduced portion of the probe 4 from the top. It is thus held between shoulders 7 and 13 of the probe 4.

Due to the fact that in the preferred embodiment the claws 6 engage under the upper flange 11 of the sleeve 9, they cannot bite in the probe 4 and the probe remains in its position even when the probe is urged downwardly by the brake disc 8. This ensures accurate detection of the fact that the brake pad has worn to a predetermined limit.

Although this invention has been described with reference to the preferred embodiment, it is to be understood that various changes or modifications may be made within the scope of the present invention.

What is claimed is:

1. A wear detector for a brake pad and means for mounting it in a hole through a backing plate for the brake pad and comprising a tubular holder for mounting in the hole in said backing plate, said holder having a flange at the top engageable with the backing plate when the holder is in the hole, and further having a plurality of claws projecting inwardly into said holder, and a sleeve mounted around said wear detector, said wear detector having a shoulder therearound, said sleeve having at its top a flange abutting said shoulder on said wear detector, said sleeve having a slit extending axially throughout the height thereof for enabling the sleeve to be mounted on said wear detector, said claws on the holder engaging the flange on said sleeve to hold said sleeve and said wear detector in position in said holder.

* * * * *